(12) United States Patent
Jeong

(10) Patent No.: US 11,724,743 B2
(45) Date of Patent: Aug. 15, 2023

(54) VEHICLE FRONT STRUCTURE

(71) Applicants: Hyundai Motor Company, Seoul (KR); Kia Motors Corporation, Seoul (KR)

(72) Inventor: Seung Min Jeong, Hwaseong-si (KR)

(73) Assignees: Hyundai Motor Company, Seoul (KR); Kia Motors Corporation, Seoul (KR)

(*) Notice: Subject to any disclaimer, the term of this patent is extended or adjusted under 35 U.S.C. 154(b) by 589 days.

(21) Appl. No.: 16/886,711

(22) Filed: May 28, 2020

(65) Prior Publication Data

US 2021/0139077 A1 May 13, 2021

(30) Foreign Application Priority Data

Nov. 12, 2019 (KR) .................. 10-2019-0144603

(51) Int. Cl.
- *B62D 21/11* (2006.01)
- *B62D 25/14* (2006.01)
- *B62D 25/08* (2006.01)

(52) U.S. Cl.
CPC .............. *B62D 21/11* (2013.01); *B62D 25/08* (2013.01); *B62D 25/14* (2013.01)

(58) Field of Classification Search
CPC .... B62D 25/08; B62D 25/088; B62D 21/152; B62D 21/11
See application file for complete search history.

(56) References Cited

U.S. PATENT DOCUMENTS

| | | | | |
|---|---|---|---|---|
| 8,720,983 | B1 * | 5/2014 | Edwards | B62D 21/152 296/203.02 |
| 11,027,685 | B2 * | 6/2021 | Izutsu | B60R 21/02 |
| 2006/0006699 | A1 * | 1/2006 | Matsuyama | B62D 25/088 296/203.02 |
| 2008/0265623 | A1 * | 10/2008 | Kiyotake | B62D 21/152 296/187.09 |
| 2009/0146455 | A1 * | 6/2009 | Honji | B62D 25/082 296/187.09 |
| 2009/0243336 | A1 * | 10/2009 | Honji | B62D 21/152 296/187.09 |
| 2011/0095568 | A1 * | 4/2011 | Terada | B62D 25/088 296/187.09 |
| 2018/0029643 | A1 * | 2/2018 | Maruyama | B62D 25/088 |
| 2019/0185065 | A1 * | 6/2019 | Jeong | B62D 25/04 |
| 2021/0179178 | A1 * | 6/2021 | Jeong | B62D 25/04 |

FOREIGN PATENT DOCUMENTS

JP 5163083 B2 * 3/2013

OTHER PUBLICATIONS

Fukushina et al., Front Body Structure of Automobile, Mar. 13, 2013, EPO, JP 51 63083 B2, Machine Translation of Description (Year: 2013).*

* cited by examiner

*Primary Examiner* — James A English
(74) *Attorney, Agent, or Firm* — Slater Matsil, LLP

(57) ABSTRACT

A vehicle front structure includes a suspension housing disposed between a front side member and a fender apron upper member, a first reinforcing member extending in a longitudinal direction of a vehicle and coupled to the suspension housing, and a first connecting portion attached to the first reinforcing member and connecting the fender apron upper member and the front side member.

20 Claims, 6 Drawing Sheets

VEHICLE FRONT STRUCTURE

CROSS-REFERENCE TO RELATED APPLICATIONS

This application claims priority to Korean Patent Application No. 10-2019-0144603, filed in the Korean Intellectual Property Office on Nov. 12, 2019, which application is hereby incorporated herein by reference.

TECHNICAL FIELD

The present disclosure relates to a vehicle front structure.

BACKGROUND

A vehicle front structure includes a pair of front side members spaced apart from each other in a width direction of a vehicle, and fender aprons, suspension housings in which upper portions of shock absorbers are mounted, and the like are connected to the front side members.

The front side members extend in a longitudinal direction of the vehicle. The front side members are directly affected by an impact load when a frontal impact occurs.

An electric vehicle is equipped with a high voltage battery under the floor thereof, and it is necessary to increase the capacity of the battery in order to extend its range to 200 miles. Due to the increased capacity of the battery, the volume of the battery may be increased by approximately 1.5 times or more compared to the existing one. Thus, structural improvement is required to achieve crashworthiness and stiffness of a vehicle body.

The above information described in this background section is provided to assist in understanding the background of the inventive concept, and may include any technical concept which is not considered as the prior art that is already known to those skilled in the art.

SUMMARY

The present disclosure has been made to solve problems occurring in the prior art while advantages achieved by the prior art are maintained intact.

The present disclosure relates to a vehicle front structure. Particular embodiments provide a vehicle front structure capable of uniformly distributing an impact load and improving safety during an impact.

According to an embodiment of the present disclosure, a vehicle front structure may include a suspension housing disposed between a front side member and a fender apron upper member, a first reinforcing member extending in a longitudinal direction of a vehicle, and coupled to the suspension housing, and a first connecting portion attached to the first reinforcing member, and connecting the fender apron upper member and the front side member.

The first reinforcing member may have a cavity which is open to the suspension housing, a top flange extending along a top edge of the first reinforcing member, and a bottom flange extending along a bottom edge of the first reinforcing member, and the top flange and the bottom flange may be coupled to the suspension housing to thereby seal the cavity.

The first connecting portion may extend from a front end of the first reinforcing member toward the fender apron upper member and the front side member.

A top end of the first connecting portion may be coupled to the fender apron upper member, and a bottom end of the first connecting portion may be coupled to the front side member.

An axis of the first connecting portion may be perpendicular to an axis of the first reinforcing member.

The vehicle front structure may further include a second connecting portion extending from a middle of the first reinforcing member toward the front side member.

A top end of the second connecting portion may be coupled to the first reinforcing member, and a bottom end of the second connecting portion may be coupled to the front side member.

The vehicle front structure may further include a support bracket coupled to the suspension housing, and the second connecting portion may be aligned with the support bracket in a longitudinal direction of the support bracket.

The top end of the second connecting portion may be coupled to a bottom end of the support bracket, and the bottom end of the second connecting portion may be coupled to the front side member.

The vehicle front structure may further include a dash panel disposed at a rear of the suspension housing, and a second reinforcing member interposed between the suspension housing and the dash panel.

The second reinforcing member may be connected to a rear end of the first reinforcing member, and the second reinforcing member may be interposed between the fender apron upper member and the dash panel.

A top end of the second reinforcing member may be coupled to the fender apron upper member.

The vehicle front structure may further include an extension connected to a rear end of the front side member, and a bottom end of the second reinforcing member may be coupled to the extension.

BRIEF DESCRIPTION OF THE DRAWINGS

The above and other objects, features and advantages of the present disclosure will be more apparent from the following detailed description taken in conjunction with the accompanying drawings, in which.

DETAILED DESCRIPTION OF ILLUSTRATIVE EMBODIMENTS

Figure 1:
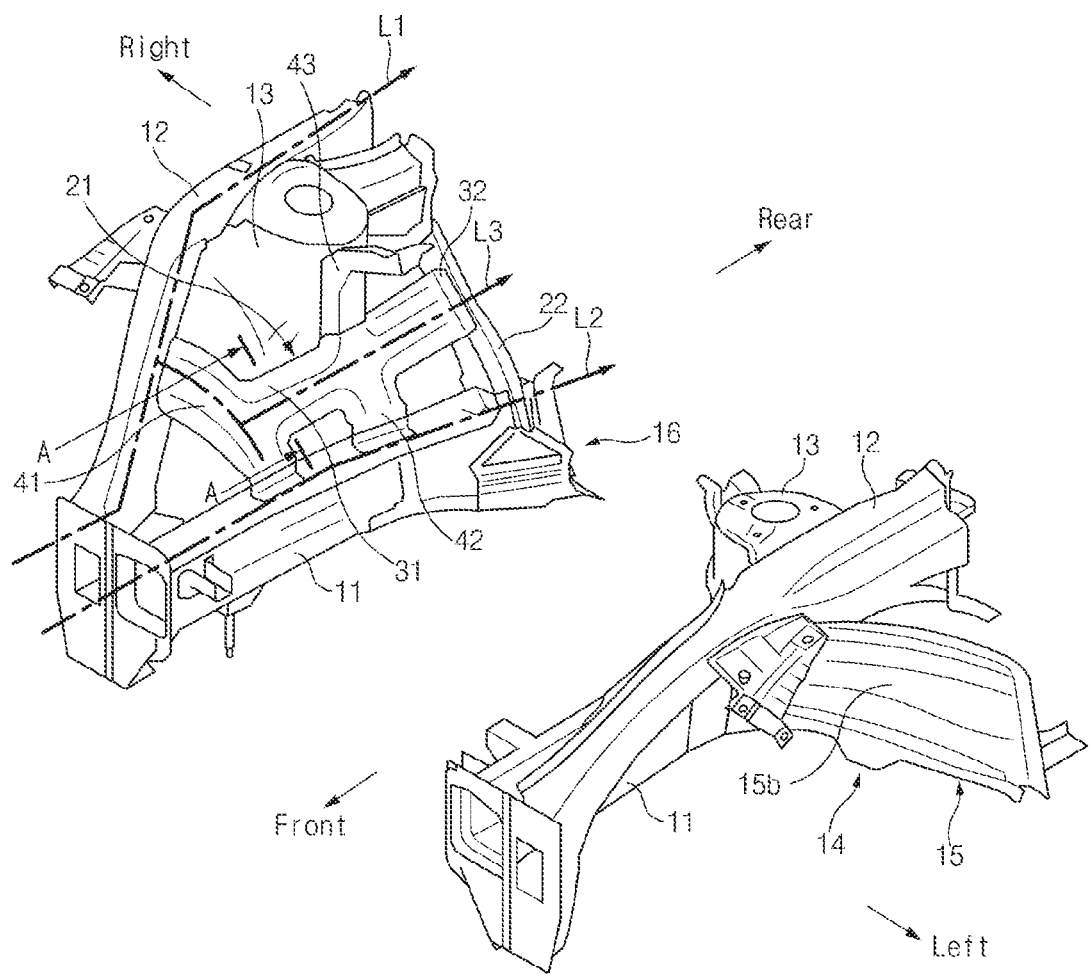
FIG. 1 illustrates a perspective view of a vehicle front structure according to an exemplary embodiment of the present disclosure.

Hereinafter, exemplary embodiments of the present disclosure will be described in detail with reference to the accompanying drawings. In the drawings, the same reference numerals will be used throughout to designate the same or equivalent elements. In addition, a detailed description of well-known techniques associated with the present disclosure will be omitted in order not to unnecessarily obscure the gist of the present disclosure.

Terms such as first, second, A, B, (a), and (b) may be used to describe the elements in exemplary embodiments of the present disclosure. These terms are only used to distinguish one element from another element, and the intrinsic features, sequence or order, and the like of the corresponding elements are not limited by the terms. Unless otherwise defined, all terms used herein, including technical or scientific terms, have the same meanings as those generally understood by those with ordinary knowledge in the field of art to which the present disclosure belongs. Such terms as those defined in a generally used dictionary are to be interpreted as having meanings equal to the contextual meanings in the relevant field of art, and are not to be interpreted as having ideal or excessively formal meanings unless clearly defined as having such in the present application.

Referring to FIG. 1, a vehicle front structure 10, according to an exemplary embodiment of the present disclosure, may include a suspension housing 13 disposed between a front side member 11 and a fender apron upper member 12, and a first reinforcing member 21 coupled to the suspension housing 13.

Each front side member 11 may extend in a longitudinal direction of the vehicle. The pair of front side members 11 may be spaced apart from each other in a width direction of the vehicle.

Each fender apron upper member 12 may extend in the longitudinal direction of the vehicle, and be curved toward the front of the vehicle. The pair of fender apron upper members 12 may be spaced apart from each other in the width direction of the vehicle. The pair of fender apron upper members 12 may be located outwards from the pair of front side members 11. A front end of the fender apron upper member 12 may be connected to a front end of the corresponding front side member 11.

Referring to FIG. 1, the fender apron upper member 12 may define a first load path L1, and the front side member 11 may define a second load path L2.

The pair of front side members 11 and the pair of fender apron upper members 12 may define both left and right sides of a front compartment of the vehicle. The front compartment may receive prime movers such as an internal combustion engine and an electric motor, and heat exchangers.

Figure 4:
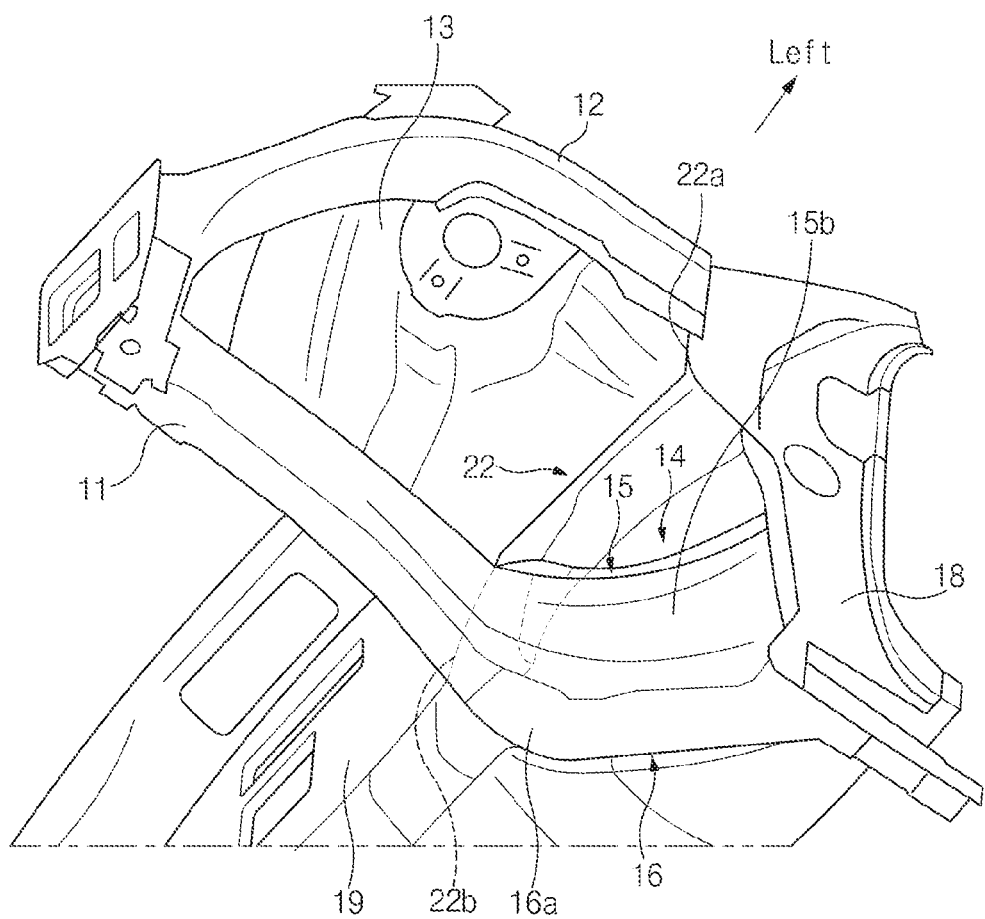
FIG. 4 illustrates a perspective view of the left side of a vehicle front structure according to an exemplary embodiment of the present disclosure, which is viewed from the bottom.
Figure 5:
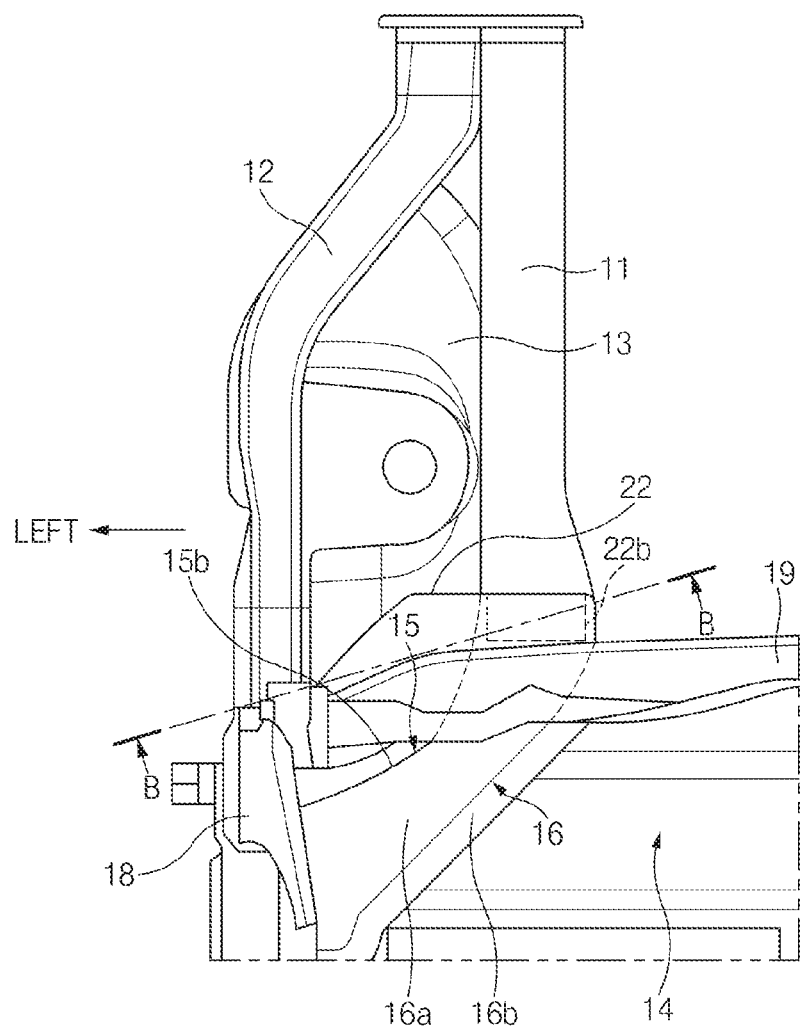
FIG. 5 illustrates a plan view of the left side of a vehicle front structure according to an exemplary embodiment of the present disclosure, which is viewed from the top.

Referring to FIGS. 4 and 5, a dash panel 19 may be disposed at the rear of the pair of fender apron upper members 12. The dash panel 19 may divide the front compartment from a passenger compartment.

Referring to FIGS. 4 and 5, an extension 14 may be connected to a rear end of the front side member 11. The extension 14 may be attached to the bottom of the dash panel 19 by welding and/or the like. For example, the extension 14 and the front side member 11 may be manufactured as individual components, and the extension 14 may be connected to the rear end of the front side member 11 using fasteners, welding, and/or the like. As another example, the extension 14 may be integrally connected to the front side member 11, so that the extension 14 and the front side member 11 may form a unitary one-piece structure.

The extension 14 may extend from the rear end of the front side member 11 toward a front pillar 18 and a side sill (not shown). In particular, the extension 14 may be curved from the rear end of the front side member 11 toward the front pillar 18.

Figure 6:
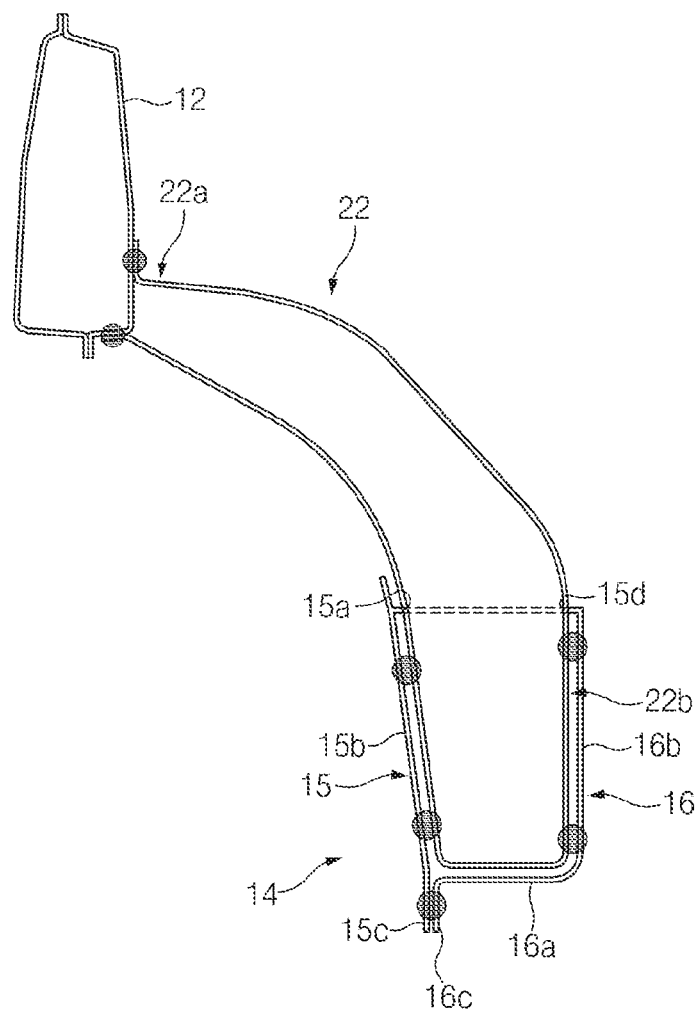
FIG. 6 illustrates a cross-sectional view taken along line B-B of FIG. 5.

Referring to FIG. 6, the extension 14 may include a side outer member 15 and a side lower member 16. The side outer member 15 may have a top wall 15a facing the top of the vehicle, and an outboard side wall 15b facing the exterior space of the vehicle. The side lower member 16 may have a bottom wall 16a facing the bottom of the vehicle, and an inboard side wall 16b facing the interior space of the vehicle. The side outer member 15 may have a first flange 15c extending vertically downward from a bottom end of the outboard side wall 15b, and the side lower member 16 may have a second flange 16c extending vertically downward from the bottom wall 16a. The first flange 15c of the side outer member 15 and the second flange 16c of the side lower member 16 may be coupled using fasteners, welding, and/or the like.

A rear end of the fender apron upper member 12 and a rear end of the extension 14 may be coupled to the front pillar 18.

The suspension housing 13 may be disposed between the front side member 11 and the corresponding fender apron upper member 12. The pair of suspension housings 13 may be spaced apart from each other in the width direction of the vehicle. An upper portion of a shock absorber may be mounted in the suspension housing 13. The suspension housing 13 may have a top flange 13a extending along a top edge of the suspension housing 13, and a bottom flange 13b extending along a bottom edge of the suspension housing 13. The top flange 13a may be coupled to the fender apron upper member 12 using fasteners, welding, and/or the like, and the bottom flange 13b may be coupled to the front side member 11 using fasteners, welding, and/or the like.

Figure 2:
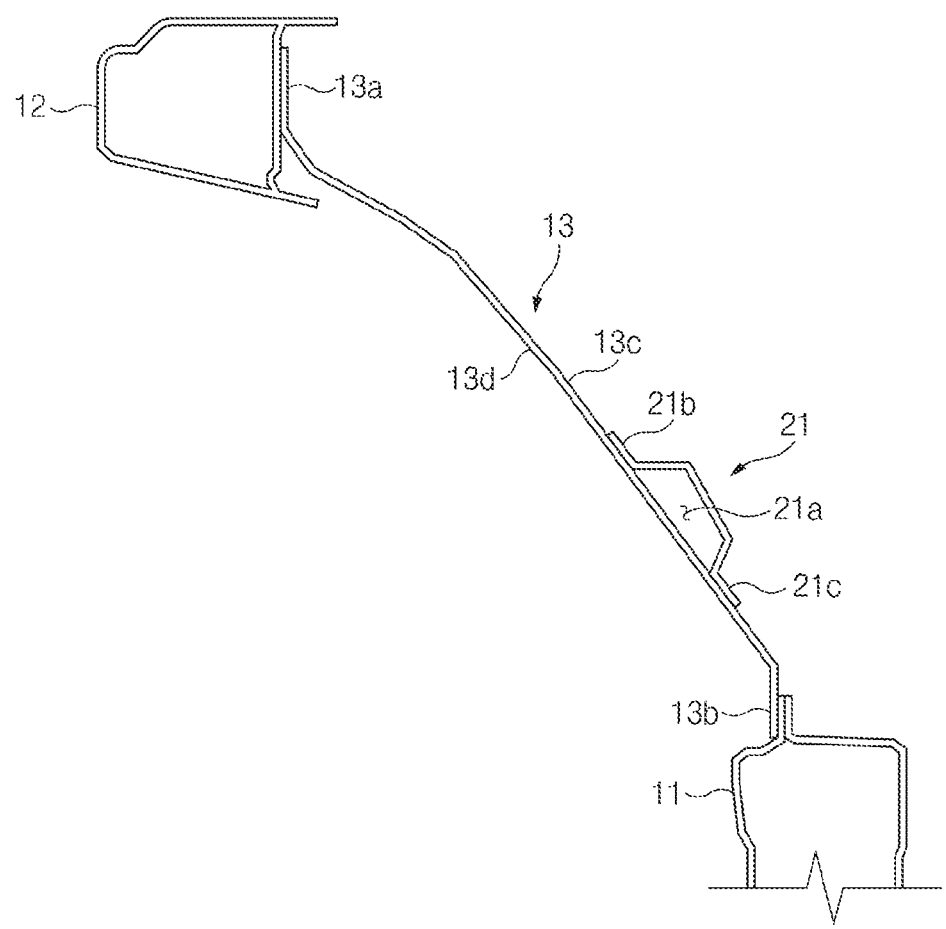
FIG. 2 illustrates a cross-sectional view taken along line A-A of FIG. 1.
Figure 3:
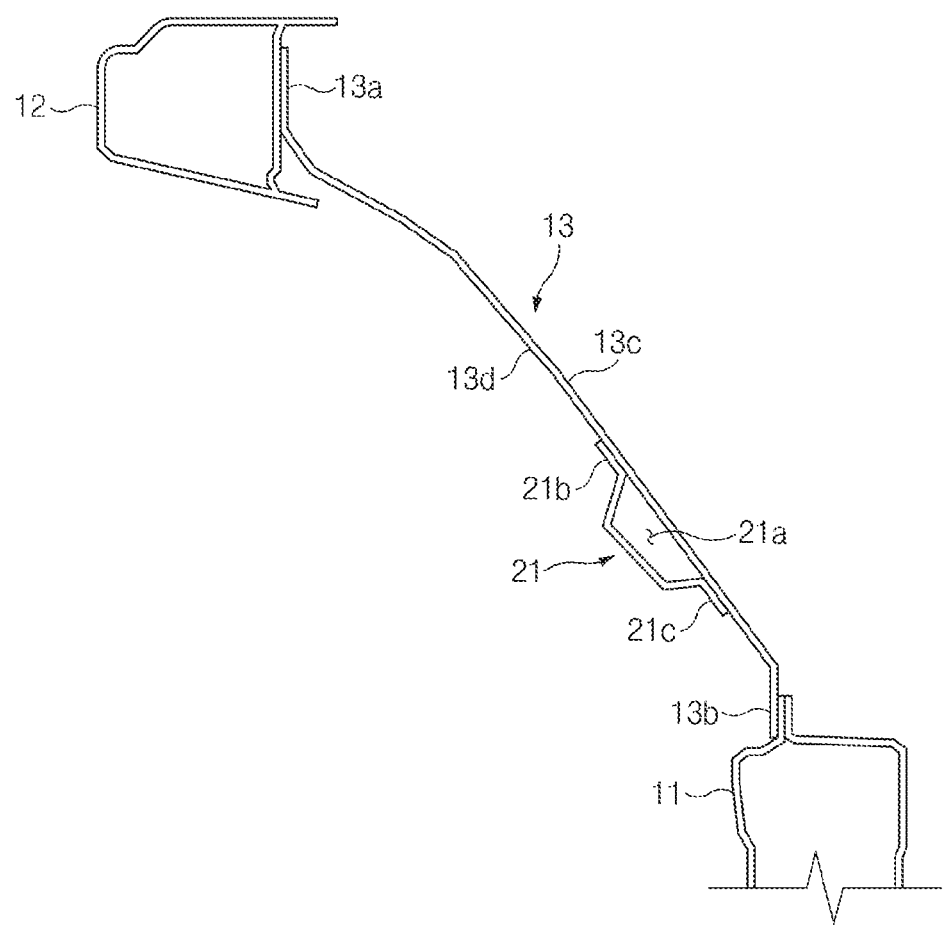
FIG. 3 illustrates a cross-sectional view of a modification to the embodiment of FIG. 2.

Referring to FIGS. 2 and 3, the suspension housing 13 may have an inboard side surface 13c facing the interior space of the vehicle, and an outboard side surface 13d facing the exterior space of the vehicle. Specifically, the inboard side surface 13c may face the front compartment of the vehicle, and the outboard side surface 13d may face a wheel house of the vehicle.

Referring to FIG. 1, the first reinforcing member 21 may extend in the longitudinal direction of the vehicle, and the first reinforcing member 21 may have a front end 31 facing the front of the vehicle, and a rear end 32 facing the rear of the vehicle. The first reinforcing member 21 may be located between the fender apron upper member 12 and the front side member 11 so that the first reinforcing member 21 may define a third load path $L_3$ between the fender apron upper member 12 and the front side member 11. The vehicle front structure 10 may have the plurality of load paths L1, L2, and L3, thereby uniformly distributing an impact load. Referring to FIGS. 2 and 3, the first reinforcing member 21 may be coupled to the suspension housing 13 using fasteners, welding, and/or the like. The first reinforcing member 21 may have a C-shaped cross-section. The first reinforcing member 21 may have a cavity 21a which is open to the suspension housing 13, a top flange 21b extending along a top edge of the first reinforcing member 21, and a bottom flange 21c extending along a bottom edge of the first reinforcing member 21. The top flange 21b and the bottom flange 21c of the first reinforcing member 21 may be coupled to the suspension housing 13 using fasteners, welding, and/or the like to thereby seal the cavity 21a. That is, the first reinforcing member 21 and the suspension housing 13 may form a closed cross-section.

As the first reinforcing member 21 coupled to the suspension housing 13 forms the closed cross-section, the stiffness of the suspension housing 13 may be reinforced and resistance to the impact load may be increased. In addition, as the first reinforcing member 21 extending in the longitudinal direction of the vehicle is coupled to the suspension housing 13, torsional stiffness of the vehicle body may be increased.

According to an exemplary embodiment, the first reinforcing member 21 may be coupled to the inboard side surface 13c of the suspension housing 13 as illustrated in FIG. 2.

According to another exemplary embodiment, the first reinforcing member 21 may be coupled to the outboard side surface 13d of the suspension housing 13 as illustrated in FIG. 3.

Referring to FIG. 1, the vehicle front structure 10 according to an exemplary embodiment of the present disclosure may include a first connecting portion 41 attached to the front end 31 of the first reinforcing member 21. The first connecting portion 41 may extend from the front end 31 of the first reinforcing member 21 toward the front side member 11 and the fender apron upper member 12. In particular, an axis of the first connecting portion 41 may be perpendicular to an axis of the first reinforcing member 21. A top end of the first connecting portion 41 may be coupled to the fender apron upper member 12 using fasteners, welding, and/or the like, and a bottom end of the first connecting portion 41 may be coupled to the front side member 11 using fasteners, welding, and/or the like so that the first connecting portion 41 may connect the front side member 11 and the corresponding fender apron upper member 12.

Referring to FIG. 1, the vehicle front structure 10 according to an exemplary embodiment of the present disclosure may include a second connecting portion 42 attached to the middle of the first reinforcing member 21. The second connecting portion 42 may extend from the middle of the first reinforcing member 21 toward the front side member 11. In particular, an axis of the second connecting portion 42 may be perpendicular to the axis of the first reinforcing member 21. A top end of the second connecting portion 42 may be coupled to the middle of the first reinforcing member 21, and a bottom end of the second connecting portion 42 may be coupled to the front side member 11 so that the second connecting portion 42 may connect the first reinforcing member 21 and the front side member 11.

Referring to FIG. 1, a support bracket 43 for reinforcing the stiffness of the suspension housing 13 may be coupled to the inboard side surface 13c of the suspension housing 13 using fasteners, welding, and/or the like. The second connecting portion 42 may be aligned with the support bracket 43 in a longitudinal direction of the support bracket 43. That is, the axis of the second connecting portion 42 may be aligned with an axis of the support bracket 43. The top end of the second connecting portion 42 may be coupled to a bottom end of the support bracket 43 using fasteners, welding, and/or the like, and the bottom end of the second connecting portion 42 may be coupled to the front side member 11 using fasteners, welding, and/or the like. Thus, a load applied to the suspension housing 13 may be distributed through the second connecting portion 42 and the support bracket 43. As the bottom end of the support bracket 43 is coupled to the top end of the second connecting portion 42, a load acting on the support bracket 43 may be distributed through the second connecting portion 42 and the first reinforcing member 21, and a moment acting on the support bracket 43 may be reduced, so that durability and stiffness may be improved.

According to an exemplary embodiment, the first connecting portion 41 may be integrally connected to the front end 31 of the first reinforcing member 21, and the second connecting portion 42 may be integrally connected to the middle of the first reinforcing member 21. Thus, the first reinforcing member 21, the first connecting portion 41, and the second connecting portion 42 may form a unitary one-piece structure.

Referring to FIG. 1, the vehicle front structure 10 according to an exemplary embodiment of the present disclosure may further include a second reinforcing member 22 connected to a rear end of the first reinforcing member 21. The second reinforcing member 22 may be disposed on the rear of the suspension housing 13. Referring to FIGS. 4 and 5, the second reinforcing member 22 may be interposed between the suspension housing 13 and the dash panel 19. A front surface of the second reinforcing member 22 may be coupled to a rear edge of the suspension housing 13 by welding and/or the like, and a rear surface of the second reinforcing member 22 may be coupled to a front surface of the dash panel 19 by welding and/or the like.

Referring to FIG. 4, a top end 22a of the second reinforcing member 22 may be adjacent to a top end of the front pillar 18. Referring to FIG. 6, the top end 22a of the second reinforcing member 22 may be coupled to the fender apron upper member 12 by welding and/or the like.

Referring to FIG. 6, a bottom end 22b of the second reinforcing member 22 may be coupled to the extension 14 by welding and/or the like. The bottom end 22b of the second reinforcing member 22 may be inserted into the inside of the extension 14 through an opening 15d of the top wall 15a of the side outer member 15 of the extension 14. The bottom end 22b of the second reinforcing member 22 may be coupled to the outboard side wall 15b of the side outer member 15 and the inboard side wall 16b and the bottom wall 16a of the side lower member 16 by welding and/or the like.

Referring to FIG. 1, the vehicle front structure 10 according to an exemplary embodiment of the present disclosure may have the plurality of load paths L1, L2, and L3. The plurality of load paths L1, L2, and L3 refer to the first load path L1 defined by the fender apron upper member 12, the second load path L2 defined by the front side member 11, and the third load path L3 defined by the first reinforcing member 21. An impact load generated during an impact of the vehicle may be transmitted through the first load path L1, the second load path L2, and the third load path L3. The load transmitted through the first load path L1 and the second load path L2 may be transmitted to the third load path L3 through the first connecting portion 41 so that the impact load may be distributed. In particular, as the first connecting portion 41 connects the fender apron upper member 12 and the front side member 11, the fender apron upper member 12 and the front side member 11 may be prevented from being separated by the load. In addition, the second reinforcing member 22 may resist the load transmitted through the first load path L1, the second load path L2, and the third load path L3, thereby minimizing a deformation of the dash panel 19 and protecting the passenger compartment more reliably.

As set forth above, according to exemplary embodiments of the present disclosure, as the first reinforcing member is coupled to the suspension housing, the stiffness of the suspension housing may be reinforced and resistance to the impact load may be increased. In addition, as the first reinforcing member extends in the longitudinal direction of the vehicle, the torsional stiffness of the vehicle body may be increased.

According to exemplary embodiments of the present disclosure, the first reinforcing member may extend in the longitudinal direction of the vehicle between the fender apron upper member and the front side member, thereby forming the plurality of load paths whereby the impact load may be uniformly distributed.

According to exemplary embodiments of the present disclosure, the second reinforcing member may resist the load transmitted through the plurality of load paths, thereby minimizing the deformation of the dash panel and protecting the passenger compartment more reliably.

Hereinabove, although the present disclosure has been described with reference to exemplary embodiments and the accompanying drawings, the present disclosure is not limited thereto, but may be variously modified and altered by those skilled in the art to which the present disclosure pertains without departing from the spirit and scope of the present disclosure claimed in the following claims.

What is claimed is:

1. A vehicle front structure, comprising:
    a suspension housing disposed between a front side member and a fender apron upper member;
    a first reinforcing member extending in a longitudinal direction of a vehicle and coupled to the suspension housing;
    a first connecting portion attached to the first reinforcing member and connecting the fender apron upper member and the front side member; and
    a second connecting portion extending from a middle of the first reinforcing member toward the front side member.

2. The vehicle front structure according to claim 1, wherein the first reinforcing member comprises:
    a cavity which is open to the suspension housing;
    a top flange extending along a top edge of the first reinforcing member; and
    a bottom flange extending along a bottom edge of the first reinforcing member, wherein the top flange and the bottom flange are coupled to the suspension housing.

3. The vehicle front structure according to claim 1, wherein the first connecting portion extends from a front end of the first reinforcing member toward the fender apron upper member and the front side member.

4. The vehicle front structure according to claim 1, wherein:
    a top end of the first connecting portion is coupled to the fender apron upper member; and
    a bottom end of the first connecting portion is coupled to the front side member.

5. The vehicle front structure according to claim 1, wherein an axis of the first connecting portion is perpendicular to an axis of the first reinforcing member.

6. A vehicle front structure, comprising:
    a suspension housing disposed between a front side member and a fender apron upper member;
    a first reinforcing member extending in a longitudinal direction of a vehicle and coupled to the suspension housing;
    a first connecting portion attached to the first reinforcing member and connecting the fender apron upper member and the front side member; and
    a second connecting portion extending from a middle of the first reinforcing member toward the front side member wherein a top end of the second connecting portion is coupled to the first reinforcing member and a bottom end of the second connecting portion is coupled to the front side member.

7. The vehicle front structure according to claim 6, further comprising a support bracket coupled to the suspension housing, wherein the second connecting portion is aligned with the support bracket in a longitudinal direction of the support bracket.

8. The vehicle front structure according to claim 7, wherein:
    the top end of the second connecting portion is coupled to a bottom end of the support bracket; and
    the bottom end of the second connecting portion is coupled to the front side member.

9. A vehicle front structure, comprising:
    a suspension housing disposed between a front side member and a fender apron upper member;
    a first reinforcing member extending in a longitudinal direction of a vehicle and coupled to the suspension housing;
    a first connecting portion attached to the first reinforcing member and connecting the fender apron upper member and the front side member;
    a second connecting portion extending from a middle of the first reinforcing member toward the front side member;
    a dash panel disposed at a rear of the suspension housing; and
    a second reinforcing member interposed between the suspension housing and the dash panel.

10. The vehicle front structure according to claim 9, wherein:
    the second reinforcing member is connected to a rear end of the first reinforcing member; and
    the second reinforcing member is interposed between the fender apron upper member and the dash panel.

11. The vehicle front structure according to claim 9, wherein a top end of the second reinforcing member is coupled to the fender apron upper member.

12. The vehicle front structure according to claim 9, further comprising an extension connected to a rear end of the front side member, wherein a bottom end of the second reinforcing member is coupled to the extension.

13. The vehicle front structure according to claim 6, wherein the first reinforcing member comprises:
    a cavity which is open to the suspension housing;
    a top flange extending along a top edge of the first reinforcing member; and
    a bottom flange extending along a bottom edge of the first reinforcing member, wherein the top flange and the bottom flange are coupled to the suspension housing.

14. The vehicle front structure according to claim 6, wherein the first connecting portion extends from a front end of the first reinforcing member toward the fender apron upper member and the front side member.

15. The vehicle front structure according to claim 14, wherein:
    a top end of the first connecting portion is coupled to the fender apron upper member; and
    a bottom end of the first connecting portion is coupled to the front side member.

16. The vehicle front structure according to claim 6, wherein:
    a top end of the second connecting portion is coupled to the first reinforcing member; and
    a bottom end of the second connecting portion is coupled to the front side member.

17. The vehicle front structure according to claim 9, wherein an axis of the first connecting portion is perpendicular to an axis of the first reinforcing member.

18. The vehicle front structure according to claim 9, wherein:

a top end of the second connecting portion is coupled to the first reinforcing member; and a bottom end of the second connecting portion is coupled to the front side member.

19. The vehicle front structure according to claim 18, further comprising a support bracket coupled to the suspension housing, wherein the second connecting portion is aligned with the support bracket in a longitudinal direction of the support bracket.

20. The vehicle front structure according to claim 19, wherein:

the top end of the second connecting portion is coupled to a bottom end of the support bracket; and the bottom end of the second connecting portion is coupled to the front side member.

* * * * *

UNITED STATES PATENT AND TRADEMARK OFFICE
CERTIFICATE OF CORRECTION

| | | |
|---|---|---|
| PATENT NO. | : 11,724,743 B2 | Page 1 of 1 |
| APPLICATION NO. | : 16/886711 | |
| DATED | : August 15, 2023 | |
| INVENTOR(S) | : Seung Min Jeong | |

It is certified that error appears in the above-identified patent and that said Letters Patent is hereby corrected as shown below:

In the Claims

In Column 7, in Claim 4, Line 42, delete "claim 1," and insert -- claim 3, --.

Signed and Sealed this
Thirty-first Day of October, 2023

Katherine Kelly Vidal
*Director of the United States Patent and Trademark Office*